(12) United States Patent
Lu et al.

(10) Patent No.: US 11,581,118 B2
(45) Date of Patent: Feb. 14, 2023

(54) TRANSFORMER AND POWER SUPPLY MODULE WITH HIGH THERMAL EFFICIENCY

(71) Applicant: Delta Electronics (Shanghai) Co., Ltd., Shanghai (CN)

(72) Inventors: Zeng-Yi Lu, Shanghai (CN); Hai-Jun Yang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 427 days.

(21) Appl. No.: 16/729,513

(22) Filed: Dec. 30, 2019

(65) Prior Publication Data

US 2020/0135379 A1 Apr. 30, 2020

Related U.S. Application Data

(63) Continuation-in-part of application No. 15/987,896, filed on May 23, 2018, now abandoned.

(30) Foreign Application Priority Data

| Jun. 8, 2017 | (CN) | ......................... | 201710427735.6 |
| Sep. 19, 2017 | (CN) | ......................... | 201710845847.3 |
| Jan. 10, 2019 | (CN) | ......................... | 201910022777.0 |

(51) Int. Cl.
*H01F 27/28* (2006.01)
*H01F 27/16* (2006.01)
(Continued)

(52) U.S. Cl.
CPC ........... *H01F 27/16* (2013.01); *H01F 27/022* (2013.01); *H01F 27/24* (2013.01);
(Continued)

(58) Field of Classification Search
CPC ........ H01F 27/16; H01F 27/022; H01F 27/24; H01F 27/2823; H01F 27/2847;
(Continued)

(56) References Cited

U.S. PATENT DOCUMENTS

| 5,408,209 A | 4/1995 | Tanzer et al. |
| 6,144,276 A | 11/2000 | Booth |

(Continued)

FOREIGN PATENT DOCUMENTS

| CN | 201853566 U | 6/2011 |
| CN | 204332627 U | 5/2015 |

(Continued)

*Primary Examiner* — Mang Tin Bik Lian
(74) *Attorney, Agent, or Firm* — CKC & Partners Co., LLC

(57) ABSTRACT

A transformer includes two first cores, a primary winding and a secondary winding. The secondary winding has a first section and a second section. The first section has a first outlet end, a second outlet end, and a first connection end, wherein the first outlet end and the second outlet end are located at a side of the first section, the first connection end is located at an opposite side of the first section. The second section has a third outlet end, a fourth outlet end, and a second connection end. The third outlet end and the fourth outlet end are located at a side of the second section, and the second connection end is located at an opposite side of the second section. A portion of the primary winding is located between the first section and the second section of the secondary winding.

20 Claims, 15 Drawing Sheets

(51) Int. Cl.
*H01F 27/24* (2006.01)
*H02M 7/00* (2006.01)
*H01F 27/02* (2006.01)

(52) U.S. Cl.
CPC ..... *H01F 27/2823* (2013.01); *H01F 27/2847* (2013.01); *H02M 7/003* (2013.01)

(58) Field of Classification Search
CPC .... H01F 27/04; H01F 27/2852; H01F 27/306; H01F 27/324; H01F 27/325; H02M 7/003
See application file for complete search history.

(56) References Cited

U.S. PATENT DOCUMENTS

| | | | |
|---|---|---|---|
| 6,522,233 B1 * | 2/2003 | Kyoso | H01F 27/324 336/200 |
| 9,202,621 B2 | 12/2015 | Wild | |
| 9,349,521 B2 * | 5/2016 | Tsai | H01F 27/2847 |
| 9,378,883 B2 | 6/2016 | Tsai et al. | |
| 9,959,960 B2 * | 5/2018 | Chen | H01F 27/29 |
| 2004/0257190 A1 | 12/2004 | Peck et al. | |
| 2007/0057757 A1 | 3/2007 | Chen et al. | |
| 2008/0079524 A1 | 4/2008 | Suzuki et al. | |
| 2008/0180205 A1 | 7/2008 | Tsai et al. | |
| 2008/0272874 A1 | 11/2008 | Chang | |
| 2010/0026437 A1 * | 2/2010 | Lin | H01F 27/2847 336/192 |
| 2011/0109418 A1 * | 5/2011 | Lee | H01F 27/2847 336/206 |
| 2011/0221558 A1 | 9/2011 | Yeh et al. | |
| 2012/0257419 A1 * | 10/2012 | Kaneko | H01F 27/306 336/198 |
| 2014/0266530 A1 * | 9/2014 | Andres | H01F 27/306 336/170 |
| 2014/0327511 A1 * | 11/2014 | Tsai | H01F 27/2847 336/220 |
| 2014/0368059 A1 | 12/2014 | Sugawara et al. | |
| 2015/0221430 A1 * | 8/2015 | Wu Li | H01F 27/2871 336/192 |
| 2015/0318098 A1 * | 11/2015 | Miyamoto | H01F 30/00 336/183 |
| 2016/0133379 A1 * | 5/2016 | Lin | H01F 27/30 336/198 |
| 2018/0301269 A1 | 10/2018 | Sundaram | |

FOREIGN PATENT DOCUMENTS

| | | |
|---|---|---|
| CN | 105281541 A | 1/2016 |
| CN | 106449046 A | 2/2017 |
| CN | 106449046 B | 1/2019 |
| JP | 2003272936 A | 9/2003 |
| JP | 2015198181 A | 11/2015 |

* cited by examiner

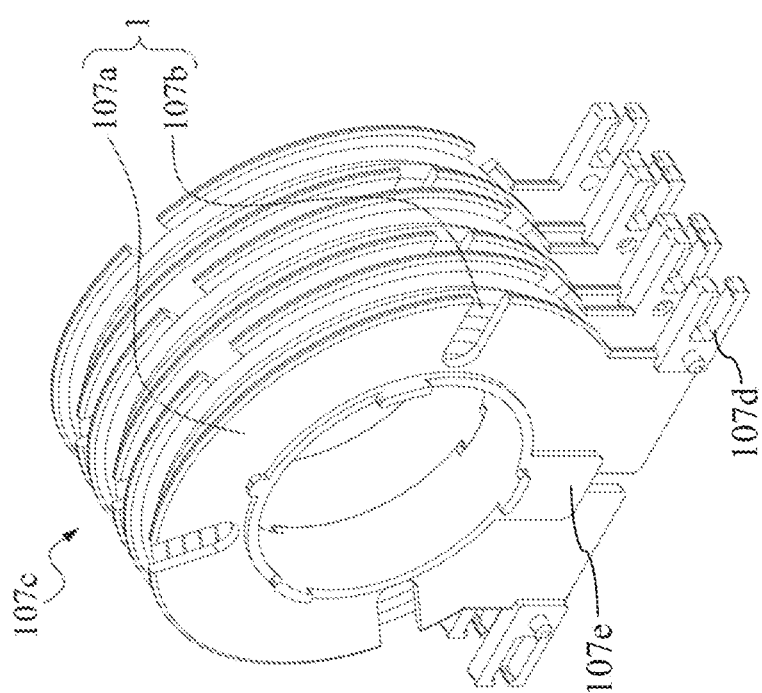
Fig. 4
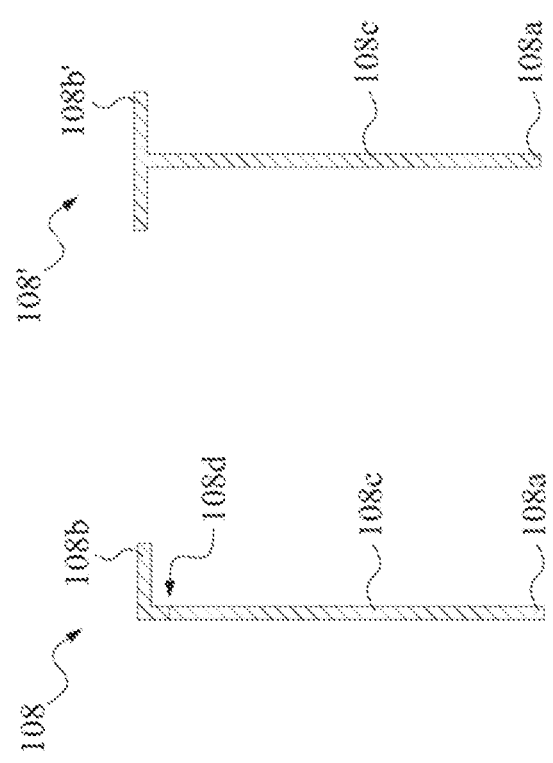
Fig. 3
Fig. 2

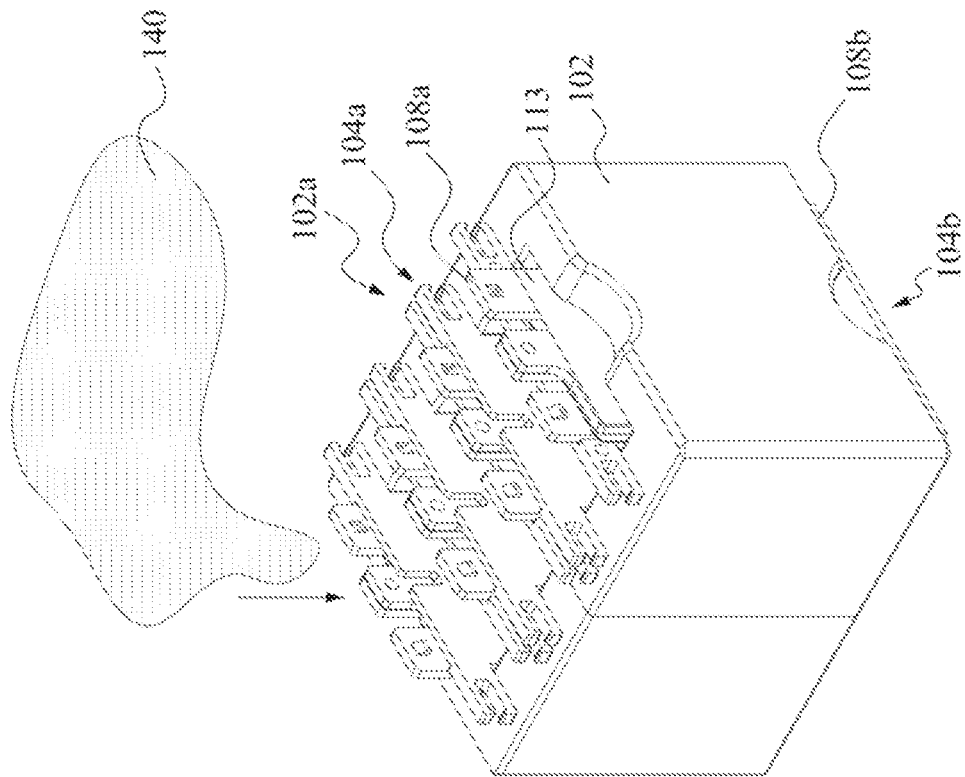

TX

TRANSFORMER AND POWER SUPPLY MODULE WITH HIGH THERMAL EFFICIENCY

CROSS-REFERENCE TO RELATED APPLICATION

This application claims priority to China Application Serial Number 201910022777.0, filed Jan. 10, 2019, and is also a continuation-in-part of U.S. application Ser. No. 15/987,896, filed on May 23, 2018, claims priority to China Application Serial Number 201710427735.6, filed Jun. 8, 2017 and 201710845847.3, filed Sep. 19, 2017, all of which are herein incorporated by reference their entireties.

BACKGROUND

Field of Invention

The present invention relates to a transformer and a power supply module thereof, more particularly, to a transformer and a power supply module with high thermal efficiency.

Description of Related Art

The thermal design of the power supply module has been one of the key considerations for power supply manufacturers, especially in the high-power supply module. Once the power supply module's temperature increases, the power conversion efficiency will reduce, or even break down the devices, cause a fire and so on.

In recent years, due to the rise of environmental awareness, oil and electricity hybrid or pure electric vehicle market are gradually increased, the power supply module applied in the vehicles needs higher power conversion efficiencies, and the overall module volume must be controlled within a predetermined limit.

How to improve the cooling efficiency of the power supply module in a limited volume, and contribute to the improvement of power conversion efficiency, still needs more efforts.

SUMMARY

In one or more embodiments, a transformer includes two first cores, at least one primary winding and at least one secondary winding. The at least one secondary winding has a first section and a second section. The first section has a first outlet end, a second outlet end, a first connection end, and a first opening, wherein the first outlet end and the second outlet end are located at a side of the first section, the first connection end is located at an opposite side of the first section. The second section has a third outlet end, a fourth outlet end, a second connection end, and a second opening. The third outlet end and the fourth outlet end are located at a side of the second section, and the second connection end is located at an opposite side of the second section. The second section is in parallel with the first section. At least a portion of a second connection side of the second section and at least a portion of a first connection side of the first section are joined to collectively form a connection portion. At least a portion of the at least one primary winding is located between the first section and the second section of the at least one secondary winding.

In one or more embodiments, the first outlet end is disposed opposite to the third outlet end, and the second outlet end is disposed opposite to the fourth outlet end.

In one or more embodiments, the first outlet end and the second outlet end constitute a first outer connection port of a first winding, the third outlet end and the fourth outlet end constitute a second outer connection port of a second winding, the first outer connection port and the second outer connection port are connected to an external circuit respectively.

In one or more embodiments, the first outlet end and the fourth outlet end constitute a third outer connection port of a first winding, the second outlet end and the third outlet end constitute a fourth outer connection port of a second winding, the third outer connection port and the fourth outer connection port are connected to an external circuit respectively.

In one or more embodiments, the secondary winding includes a single piece of bent conductive metal sheet.

In one or more embodiments, the conductive metal sheet is a copper sheet.

In one or more embodiments, the secondary winding further includes an insulation sheet between the first section and/or the second section and the first cores.

In one or more embodiments, the secondary winding further includes at least one extension portion coupled to at least one side of the connection portion.

In one or more embodiments, the extension portion and the connection portion are of an integrally formed piece.

In one or more embodiments, the first section of the secondary winding, the primary winding, and the second section of the secondary winding are sequentially arranged.

In one or more embodiments, the at least one secondary winding includes a first secondary winding and a second secondary winding, the at least one primary winding includes a first primary winding, a second primary winding, and a third primary winding, wherein the first section of the first secondary winding, the first primary winding, the second section of the first secondary winding, the second primary winding, the first section of the second secondary winding, the third primary winding, and the second section of the second secondary winding are sequentially arranged.

In one or more embodiments, the at least one secondary winding includes a first secondary winding and a second secondary winding, the at least one primary winding includes a first primary winding, a second primary winding, and a third primary winding, wherein the first section of the first secondary winding, the first primary winding, the first section of the second secondary winding, the second primary winding, the second section of the first secondary winding, the third primary winding, and the second section of the second secondary winding are sequentially arranged.

In one or more embodiments, the first outlet end, the second outlet end, the third outlet end and the fourth outlet end all include a raised portion having a height.

In one or more embodiments, the transformer further includes at least one bobbin, wherein the primary winding includes a plurality of coils respectively wound in slots of the bobbin, and the bobbin has a convex position block that correspondingly engages the first opening and/or the second opening when the transformer is assembled.

In one or more embodiments, the coils of the primary winding constitute a triple insulation wire.

In one or more embodiments, the transformer further includes an inductor having a second core disposed at one side of the first cores, and at least one inductor winding located between the second core and the first cores.

In one or more embodiments, a power supply module includes the transformer.

In one or more embodiments, the power supply module further includes a chamber that accommodates the transformer.

In one or more embodiments, the power supply module further includes a thermal resin filled into the chamber and at least partially wrapped around the transformer.

In one or more embodiments, the power supply module further includes a heat dissipation plate located under and/or around the chamber to dissipate heat out of the chamber.

In one or more embodiments, the heat dissipation plate is a water-cooling plate.

In sum, the magnetic component as discussed herein modify the heat-dissipating end of the annular metal plate to have an enlarged thermal dissipation area such that more areas can be applied with heat pastes. When the magnetic component is implemented on a high-power automotive power supply, the heat-dissipation ability of the winding module can be effectively risen by utilizing larger thermal dissipation area to dissipate heat with the water-cooling metal block such that a compact automotive power supply with high reliability and good heat dissipation effect can be achieved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2 illustrates a cross-sectional view of an annular metal plate in FIG. 1;

FIG. 3 illustrates a cross-sectional view of an annular metal plate according to another embodiment of the present disclosure;

FIG. 4 illustrates a perspective view of a second winding module in FIG. 1;

FIG. 7 illustrates an assembled view of the magnetic component according to still another embodiment of the present disclosure;

DETAILED DESCRIPTION

Figure 1:
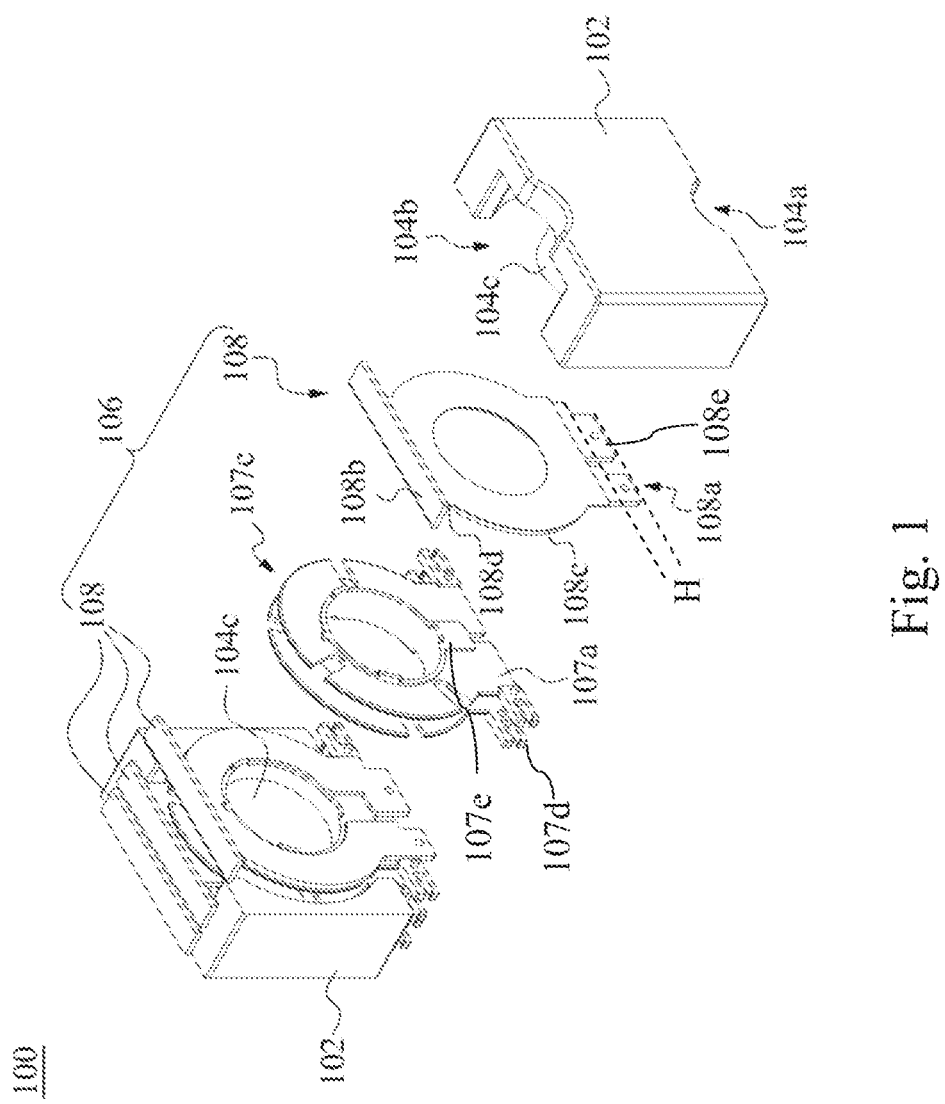
FIG. 1 illustrates an exploded view of a magnetic component according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

An aspect of the present disclosure is to provide a magnetic component utilized in an automotive power supply. The magnetic component within the automotive power supply occupies a larger volume, weight, and is also one of the main heat-generating elements. The present disclosure will enhance its heat-dissipating capacity as well as optimizing its power conversion efficiency.

FIG. 1 illustrates an exploded view of a magnetic component 100 according to one embodiment of the present disclosure. The magnetic component 100 includes a magnetic core 102, a first winding module 106 and a second winding module 107 (also referring to FIG. 4). The magnetic core 102 includes two opposite openings (104a, 104b) and at least one magnetic column 104c. In this embodiment, the magnetic core 102 consists of two half magnetic cores in mirror symmetry, but not being limited to. In this embodiment, the magnetic core 102 may be iron oxide mixtures, such as manganese-zinc ferrite, but other metal oxide materials can also be applied on demand without limitation.

The first winding module 106 includes multiple annular metal plates 108 that are inserted through by the magnetic column 104c. Each annular metal plate 108 includes an electrical connection end 108a, an annular portion 108c and a heat-dissipating end 108b. The electrical connection end 108a and the heat-dissipating end 108b are located at (or aligned with) the two opposite openings (104a, 104b) of the magnetic core 102 after the magnetic component is assembled. A thermal-dissipation area of the heat-dissipating end 108b is greater than a cross-sectional area of a connection portion 108d between the heat-dissipating end 108b and the annular portion 108c such that more thermal dissipation area can be applied with heat paste. In this embodiment, the magnetic component 100 can be a transformer, the first winding module 106 can be a secondary winding of the transformer, and the second winding module 107 can be a primary winding of the transformer.

In this embodiment, the electrical connection end 108a has a protrusion portion 108e that has a height H. The protrusion portion 108e is used to inserted into a printed circuit board, and the height H may be varied to control an insulating gap between the heat-dissipating end 108b and a bottom surface of a concave portion 126 (referring to FIG. 8).

In this embodiment, each annular metal plate 108 can be a single coil of circuit, but the annular metal plates 108 can also be electrically coupled with one another to form multiple coils of circuit.

In this embodiment, each annular metal plate 108 can be an annular cooper plate applied in the low-voltage high-current automotive applications, but other metal materials can also be applied according to actual demands.

In this embodiment, a total sum of the thermal dissipation areas (at the heat-dissipating ends 108b) of the first winding module 106 is greater than or equal to an area of the corresponding opening 104b of the magnetic core 102 to assure a greater thermal dissipation area and the heat-dissipating end 108b protruded out of the opening 104b.

Reference is made to FIG. 2 and FIG. 3. FIG. 2 illustrates a cross-sectional view of an annular metal plate in FIG. 1, and FIG. 3 illustrates a cross-sectional view of an annular metal plate according to another embodiment of the present disclosure. As illustrated in FIG. 2, a cross-section of the heat-dissipating end 108b and a cross-section of the annular portion 108c collectively define an L-shaped cross-section. The L-shaped cross-section is formed by bending the heat-dissipating end 108b or other mold-manufactured to enlarge the thermal dissipation area. However, the cross-section of the heat-dissipating end 108b and the cross-section of the annular portion 108c is not limited to form an L-shape, and any shapes capable of enlarging the thermal dissipation area are applicable. For example, as illustrated in FIG. 3, a cross-section of the heat-dissipating end 108b' and a cross-section of the annular portion 108c of the annular metal plate 108' collectively define a T-shaped cross-section.

In this embodiment, the heat-dissipating end 108b of the annular metal plate 108 protrudes out of the corresponding opening 104b to be in thermal contact with a heat-dissipating device, e.g., a metallic water-cooling block. The electrical connection end 108a of the annular metal plate 108 also protrudes out of the corresponding opening 104a to be electrically coupled with a printed circuit board.

Figure 10:
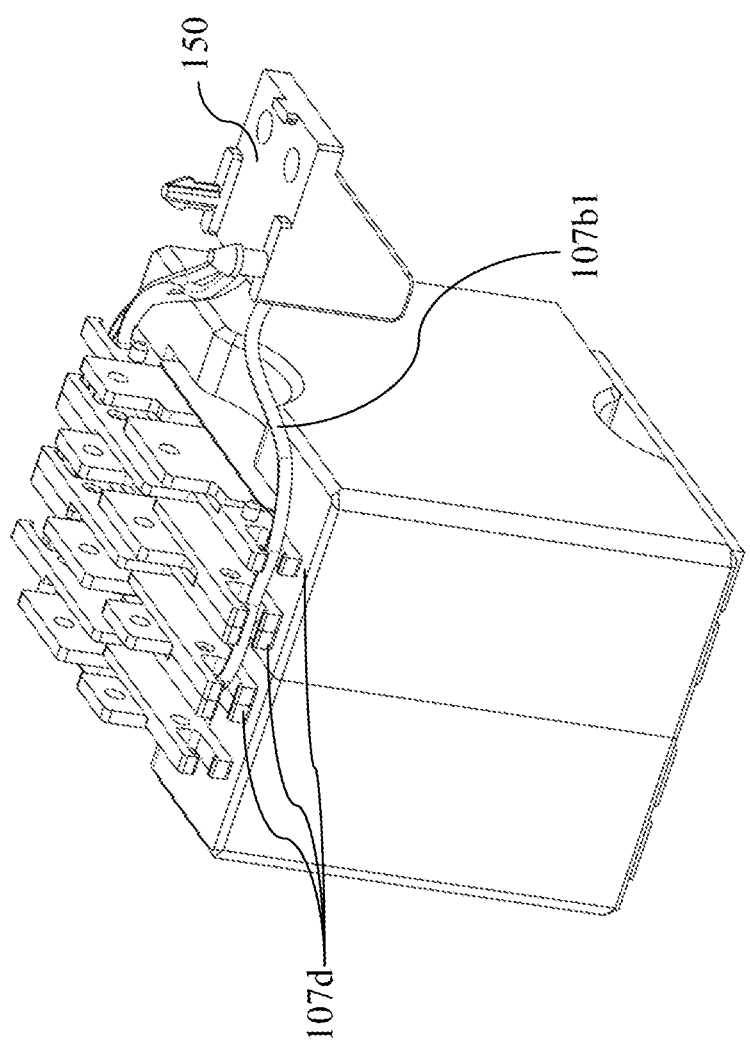
FIG. 10 illustrates a perspective view to show a coil wire of the magnetic component being coupled to a lead terminal according to one embodiment of the present disclosure.

Reference is made to FIG. 4 and FIG. 10. FIG. 4 illustrates a perspective view of a second winding module in FIG. 1. FIG. 10 illustrates a perspective view to show a coil wire of the magnetic component being coupled to a lead terminal according to one embodiment of the present disclosure. The second winding module 107 includes multiple bobbins 107a, and the annular metal plates 108 and the bobbins 107a are alternately arranged within an inner chamber of the magnetic core 102. The second winding module 107 includes multiple coil wires 107b wound within a coil cavity 107c of each bobbin 107a. In this embodiment, the coil wires 107b are three layers insulated wires (electrically-conductive wire with insulated sheath). The bobbin 107a is made from electrical insulating materials such that the annular metal plates 108 can be electrical insulated by the bobbins 107a after they are assembled within the magnetic core 102. When the magnetic component 100 serves as a transformer, a quantity and turns of the coil wires 107b and the annular metal plates 108 can be varied to achieve a desired voltage according to actual demands. In this embodiment, each bobbin 107a also has a plurality of wire management slots 107d arranged symmetrically. The coil wires 107b have their ends 107b1 led through corresponding ones of the wire management slots 107d and electrically connected to a lead terminal 150.

In this embodiment, each bobbin 107a has a convex position block 107e, and the electrical connection end 108a has a notch 108f, and the convex position block 107e engages the notch 108f when the bobbins 107a and the annular metal plates 108 are assembled within the magnetic core 102.

Figure 5:
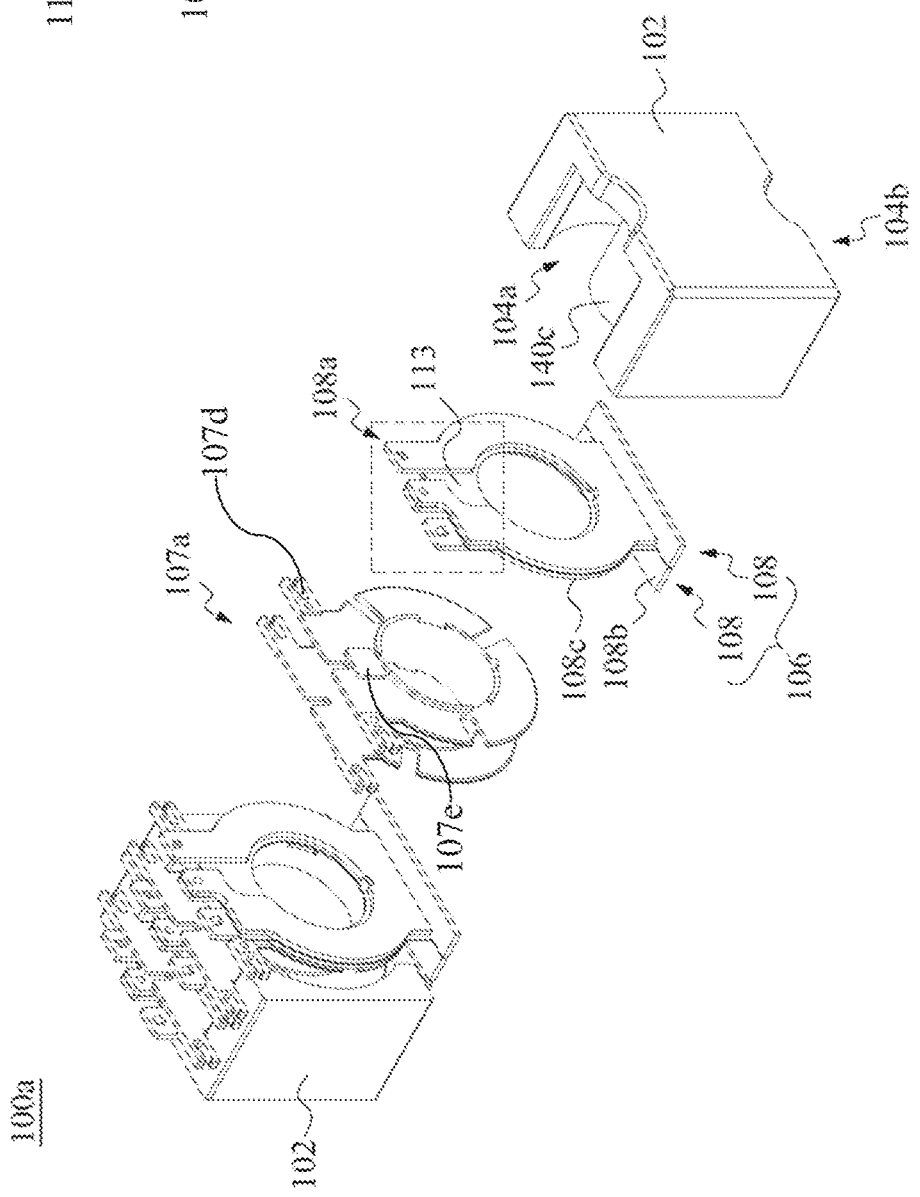
FIG. 5 illustrates an exploded view of a magnetic component according to another embodiment of the present disclosure.

Reference is made to FIG. 5. FIG. 5 illustrates an exploded view of a magnetic component according to another embodiment of the present disclosure. The magnetic component 100a is different from the magnetic component 100 in that each coil of the magnetic component comprises two turns constituted by two annular metal plates 108. In particular, two annular metal plates 108 are overlapped and insulated by an insulation sheet 113. When each coil of the magnetic component comprises two turns constituted by two annular metal plates 108, each heat-dissipating end 108b has a smaller thermal dissipation area, i.e., compared with the thermal dissipation area of the annular metal plate 108 in FIG. 1, the heat-dissipating ends 108b are electrically insulated, e.g. by the insulation sheet 113. FIG. 5 only illustrates each coil of the magnetic component comprises two turns constituted by two annular metal plates 108, but the coil of the magnetic component may comprise more turns constituted by the annular metal plates 108.

Figure 6:
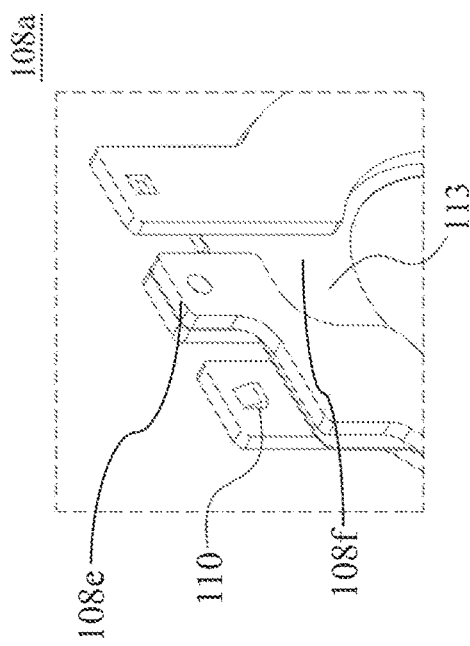
FIG. 6 illustrates an enlarged view of the heat-dissipation end in FIG. 5.

Reference is made to FIG. 6. FIG. 6 illustrates an enlarged view of the heat-dissipation end 108a in FIG. 5. Each electrical connection ends of the two annular metal plates 108 has a barb structure 110 that has an anti-extraction functionality. The two barb structures 110 of the two annular metal plates 108 faces away from each other and not overlapped or aligned in position. In this embodiment, the barb structure 110 is formed by punching onto one surface of the annular metal plate 108 to form a convex portion on an opposite surface of the annular metal plate 108, but the manufacturing method is not limited to this way. The barb structure 110 is configured to engage inside the printed circuit board to prevent from easy extraction.

Reference is made to FIG. 7. FIG. 7 illustrates an assembled view of the magnetic component 100a in FIG. 5. When the first winding module 106 and the second winding module 107 are alternately arranged (as illustrated in FIG. 4) and assembled, and installed into an inner chamber 102a of the magnetic core 102 as illustrated in FIG. 7. In this embodiment, the magnetic component may have a thermal resin 140 filled into the inner chamber 102a of the magnetic core 102, so as to fill into all air gaps among the first winding module 106 and the second winding module 107, thereby enhancing the heat-dissipating efficiency of the first winding module 106 and the second winding module 107. After the magnetic component is assembled, the heat-dissipating end 108b protrudes out of the corresponding opening 104b to be thermal contact with a heat-dissipating device, e.g., a water-cooling metal block, while the electrical connection end 108a also protrudes out of the corresponding opening 104a to be coupled with a printed circuit board.

Figure 8:
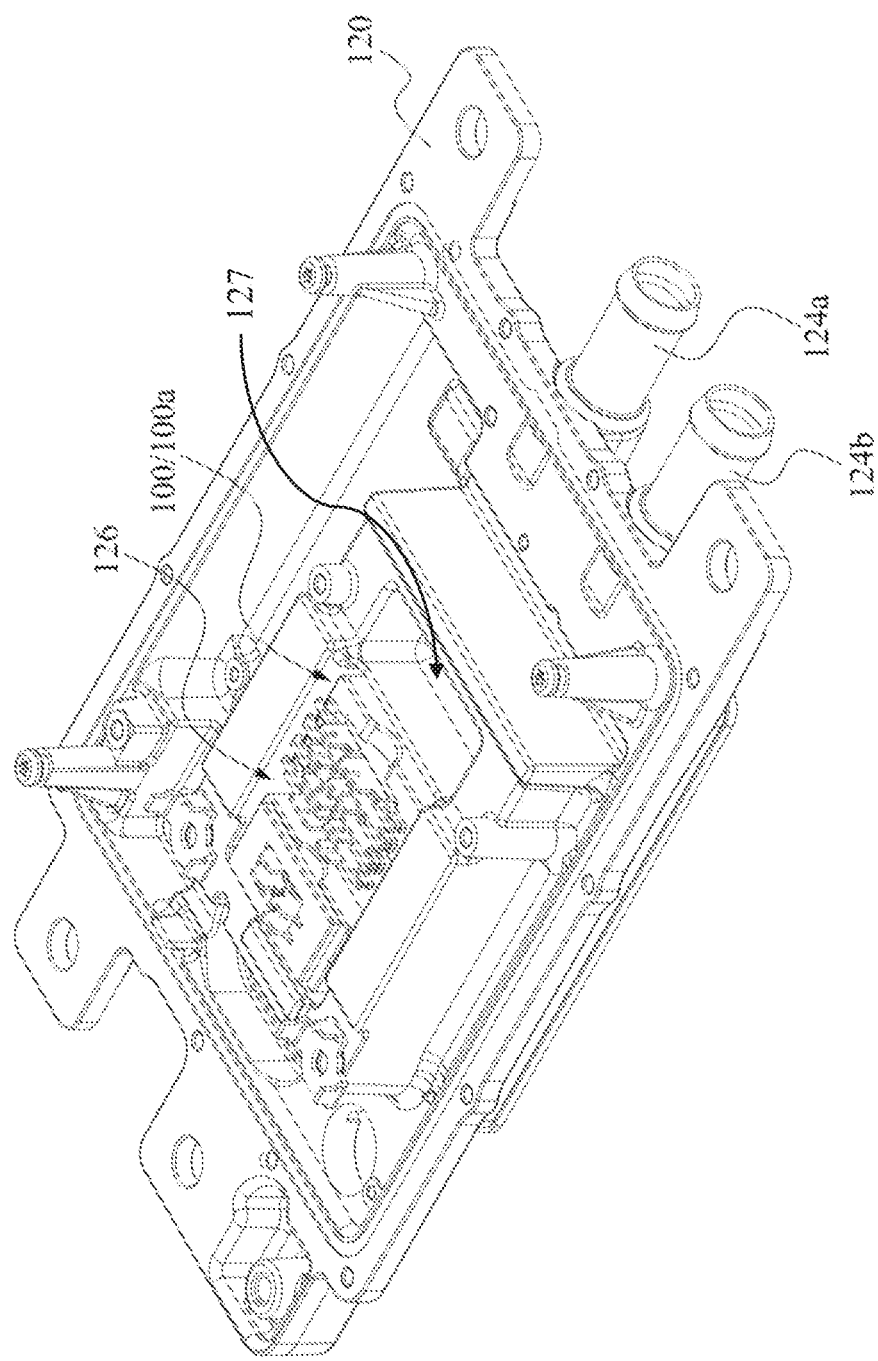
FIG. 8 illustrates an assembled view of the magnetic component coupled to a water-cooling metal block according to another embodiment of the present disclosure.

Reference is made to FIG. 8 and FIG. 10. FIG. 8 illustrates an assembled view of the magnetic component coupled to a water-cooling metal block according to another embodiment of the present disclosure. When all components of the magnetic component (100a or 100) are assembled, the heat-dissipating end 108b is used to thermally contact a water-cooling metal block 120. In this embodiment, the water-cooling metal block 120 has a liquid-cooling circulation passage inside thereof, and a water-cooling liquid is circulated through an inlet 124a and an outlet 124b. The water-cooling metal block 120 also has a concave portion 126 to accommodate the magnetic component (100a or 100), and the heat-dissipating end 108b of the magnetic component (100a or 100) is in thermal contact with a bottom surface of the concave portion 126. In another embodiment, the concave portion 126 may also be filled with a thermal resin, e.g., between the heat-dissipating end 108b and the bottom surface of the concave portion 126. In this embodiment, each bobbin 107a also has a plurality of wire management slots 107d arranged symmetrically. The coil wires 107b have their ends 107b1 led through corresponding ones of the wire management slots 107d and electrically connected to a lead terminal 150. The lead terminal 150 is accommodated in another concave portion 127 adjacent to a side of the magnetic component (100a or 100).

Figure 9:
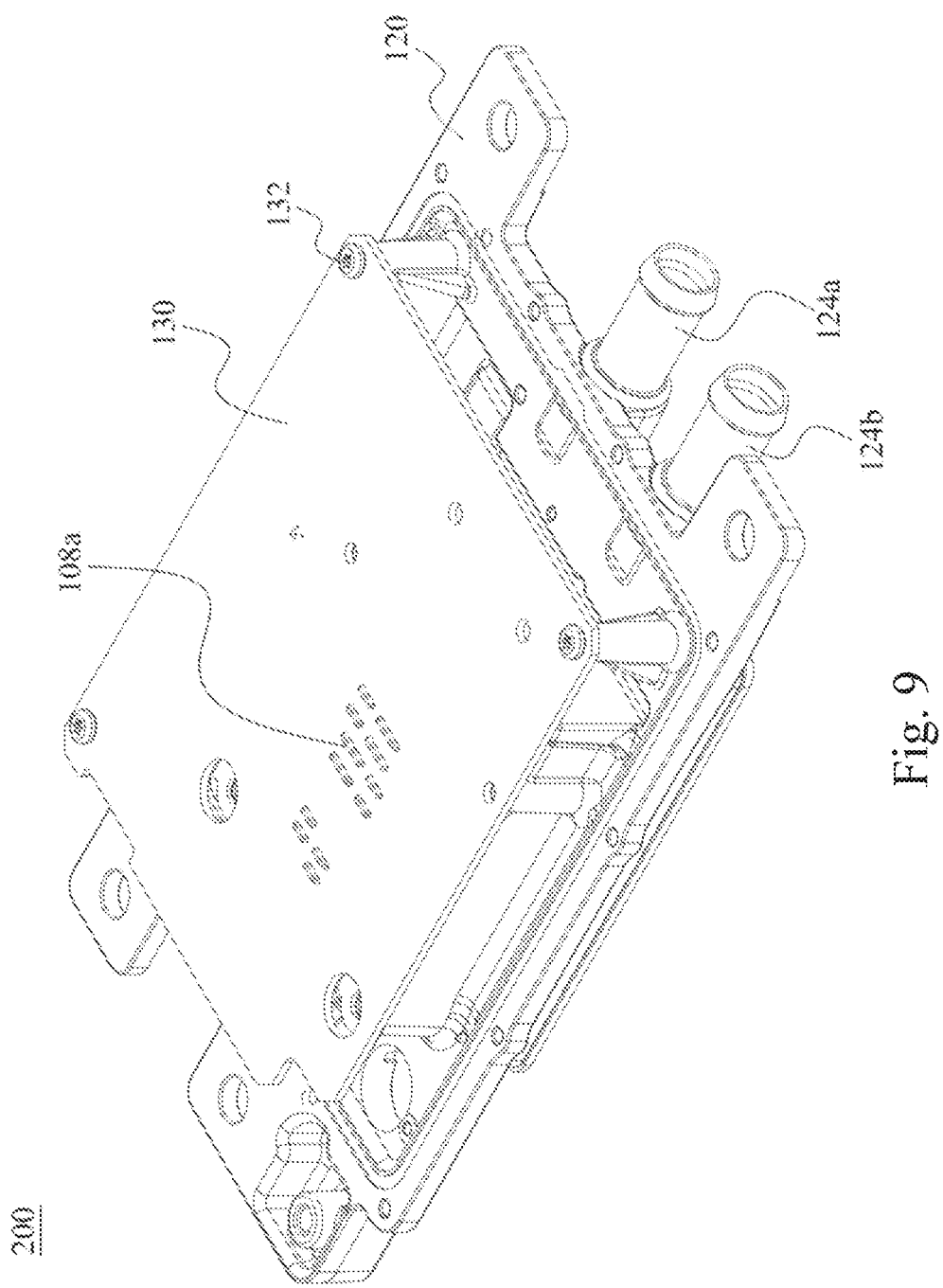
FIG. 9 illustrates an assembled view of an automotive power supply according to one embodiment of the present disclosure.

Reference is made to FIG. 9. FIG. 9 illustrates an assembled view of an automotive power supply 200 according to one embodiment of the present disclosure. After the magnetic component (100a or 100) is assemble to the water-cooling metal block 120 and other associated electronic components are installed, a printed circuit board 130 can be attached upon. And the electrical connection end 108a of the magnetic component (100a or 100) is inserted into a connection hole of the printed circuit board 130, and fasteners 132, e.g., screws, are used to secure the printed circuit board 130 to the water-cooling metal block 120 and the magnetic component (100a or 100). The height H of the protrusion portion 108e may be varied to control an insulating gap between the heat-dissipating end 108b and a bottom surface of the concave portion 126 (referring to FIG. 8).

As discussed above, the annular metal plate 108 of the magnetic component (100a or 100) has its electrical connection end for an electrical coupling function and its heat-dissipating end for a thermal dissipation function. However, the heat-dissipating end of the annular metal plate may be used both for the electrical coupling function and the thermal dissipation function. For example, the heat-dissipating end of the annular metal plate, e.g., the heat-dissipating end 108b, is coupled to a printed circuit board equipped with excellent heat-dissipating efficiency, e.g., the printed circuit board equipped with heat-dissipating fins. The thermal dissipation area at heat-dissipating end is expanded to improve thermal performance and the heat-dissipating end also serves as an electrical connection interface to the printed circuit board.

In sum, the magnetic component as discussed herein modify the heat-dissipating end of the annular metal plate to have a larger thermal dissipation area such that more areas can be applied with heat pastes. When the magnetic component is implemented on a high-power automotive power supply, the heat-dissipation efficiency of the winding module can be effectively solved by utilizing larger thermal dissipation area to dissipate heat to the water-cooling metal block such that a compact automotive power supply with high reliability and good heat dissipation can be achieved.

Figure 11:
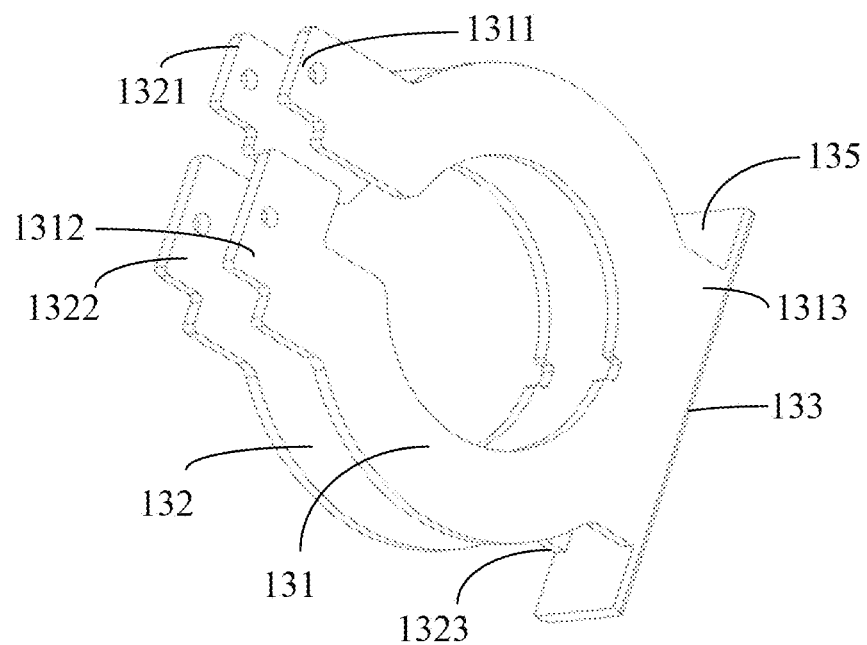
FIG. 11 illustrates a perspective view of a secondary winding according to one embodiment of the present disclosure.
Figure 12:
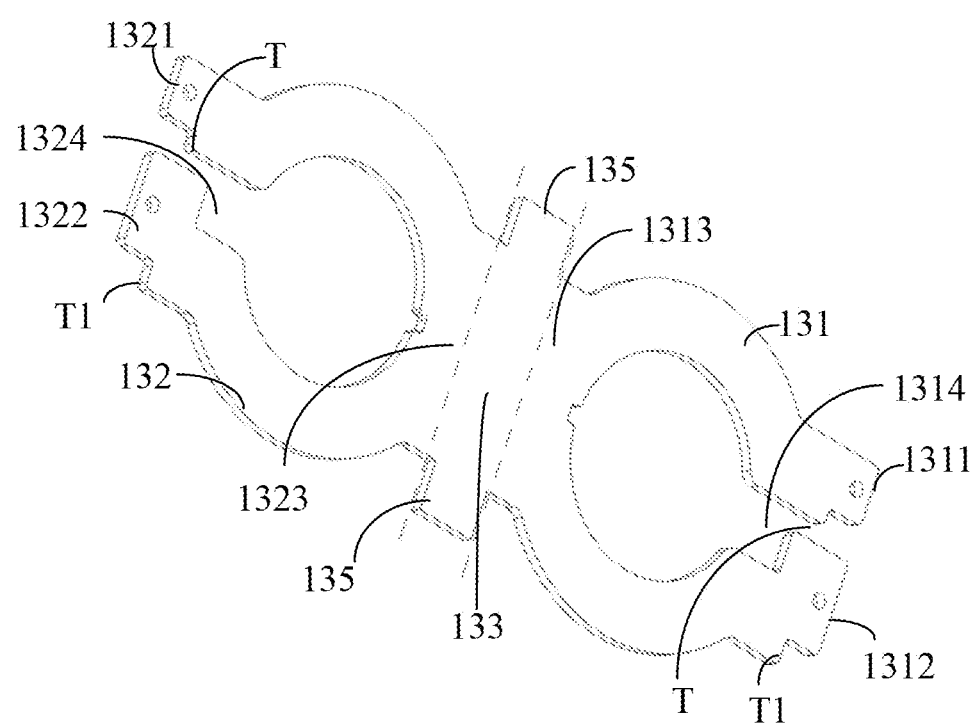
FIG. 12 illustrates a planar view of the secondary winding in FIG. 11.
Figure 13:
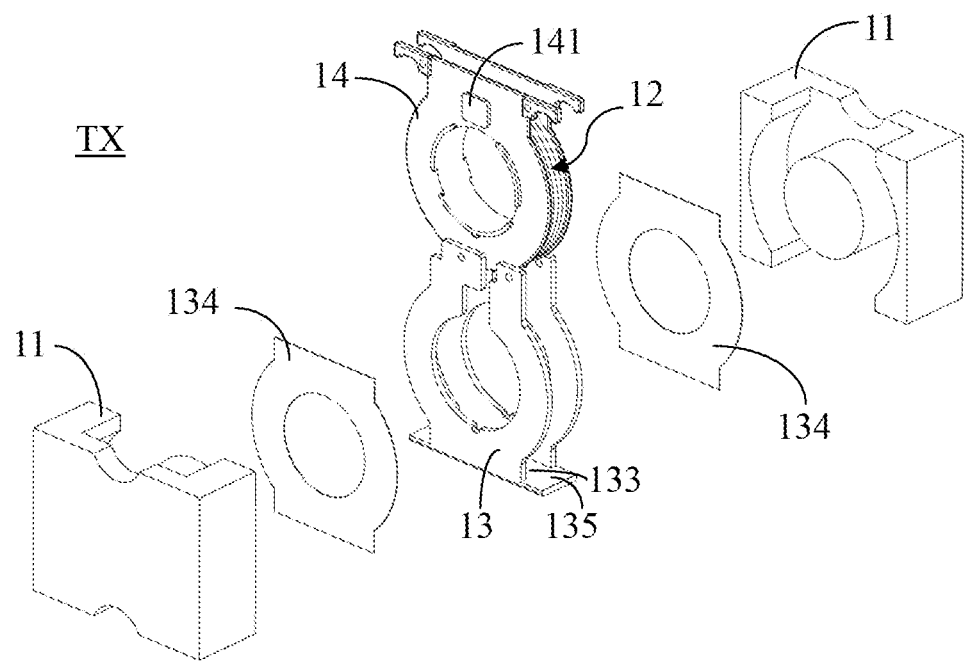
FIGS. 13-14 illustrate exploded views of a transformer according to one embodiment of the present disclosure, wherein the windings in FIG. 13 are assembled in FIG. 14.
Figure 14:
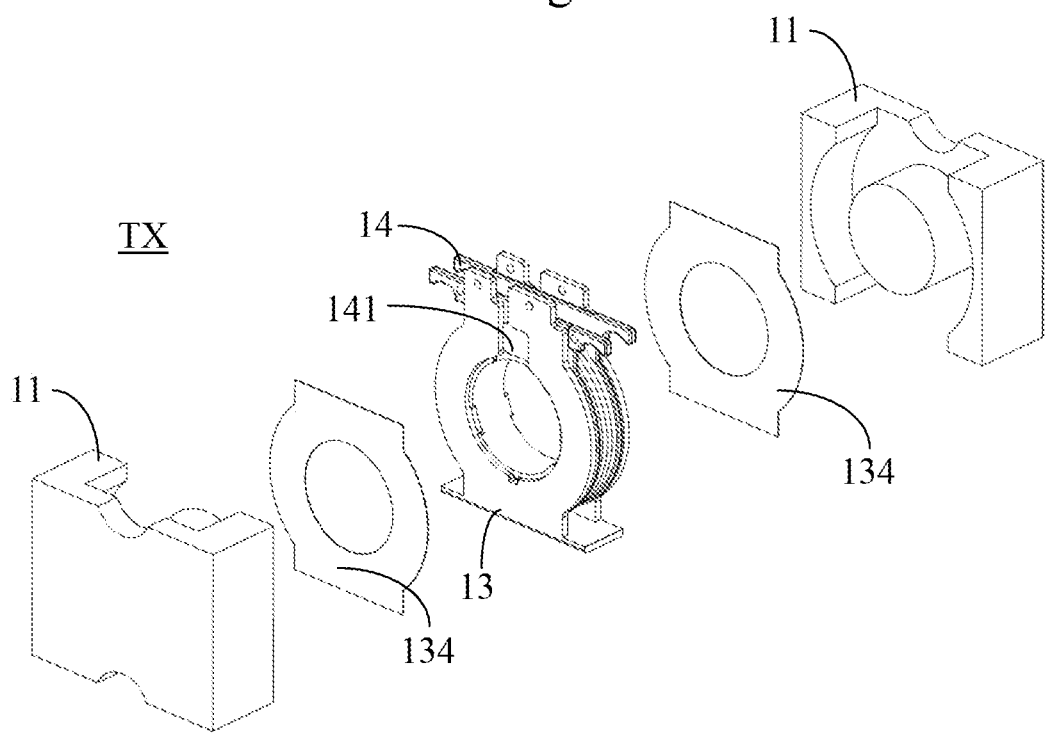

Reference is made to FIGS. 11-14. FIG. 11 illustrates a perspective view of a secondary winding according to one embodiment of the present disclosure, FIG. 12 illustrates a planar view of the secondary winding in FIG. 11. FIGS. 13-14 illustrate exploded views of a transformer according to one embodiment of the present disclosure, wherein the windings are assembled in FIG. 14. The transformer TX includes windings and two first cores 11 that are located opposite to each other. The windings include a primary winding 12 and a secondary winding 13. The core is also referred as the magnetic core in previous embodiments. The secondary winding 13 includes a first section 131 and a second section 132. The first section 131 includes a first outlet end 1311, a second outlet end 1312, a first connection end 1313 and a first opening 1314. The first outlet end 1311 and the second outlet end 1312 are at a side of the first section 131 while the first connection end 1313 is at an opposite side of the first section 131. The first outlet end 1311 is spaced from the second outlet end 1312. The second section 132 has a third outlet end 1321, a fourth outlet end 1322, a second connection end 1323 and a second opening 1324. The third outlet end 1321 and the fourth outlet end 1322 are at a side of the second section 132 while the second connection end 1323 is at an opposite side of the second section 132. The third outlet end 1321 is spaced from the fourth outlet end 1322. The second section 132 is in parallel with the first section 131, at least a portion of the second connection end 1323 and at least a portion of the first connection end 1313 are joined to collectively form a connection portion 133. The primary winding 12 is located between the first section 131 and the second section 132 of the secondary winding 13.

The main heat dissipation path within the transformer is that heat generated by the primary winding 12 is transferred to the secondary winding 13 and then transferred to an outer environment through its connection portion 133.

In this embodiment, the first section 131 and the second section 132 have substantially the same or similar profiles or dimensions.

In this embodiment, the first outlet end 1311 is opposite to and spaced from the third outlet end 1321, and the second outlet end 1312 is opposite to and spaced from the fourth outlet end 1322.

In an embodiment, the first outlet end 1311 and the second outlet end 1312 constitute a first outer connection port of a first coil, and the third outlet end 1321 and the fourth outlet end 1322 constitute a second outer connection port of a second coil. The first outer connection port and the second outer connection port are respectively connected to an external circuit, e.g., the printed circuit board 130 in FIG. 9. In this embodiment, an electric current is routed from the first outlet end 1311 to the second outlet end 1312, i.e., an electric current is input from the first outlet end 1311 and output from the second outlet end 1312. Similarly, an electric current is routed from the third outlet end 1321 to the fourth outlet end 1322, i.e., an electric current is input from the third outlet end 1321 and output from the fourth outlet end 1322.

In another embodiment, the first outlet end 1311 and the fourth outlet end 1322 constitute a third outer connection port of the first coil, and the second outlet end 1312 and the third outlet end 1321 constitute a fourth outer connection port of the second coil. The third outer connection port and the fourth outer connection port are respectively connected to an external circuit, e.g., the printed circuit board 130 in FIG. 9. The primary winding 12 and the first and/or second coil of the secondary winding form a sandwich structure, thereby effectively improving a coupling between the primary winding and the secondary winding, reducing the loss, and improving the power supply efficiency. Specifically, in this embodiment, an electric current is routed from the first outlet end 1311 to the fourth outlet end 1322, i.e., an electric current is input from the first outlet end 1311 and output from the fourth outlet end 1322, thereby constituting a sandwich structure with the primary winding 12, and effectively enhancing the coupling between the primary winding and the secondary winding, and can further improve the power supply efficiency compared with a single stack structure. Similarly, an electric current is routed from the second outlet end 1312 to the third outlet end 1321, and i.e., an electric current is input from the second outlet end 1312 and output from the third outlet end 1321, and a similar function and advantage can be achieved.

In this embodiment, the secondary winding 13 is integrally formed by stamping a single piece of conductive metal sheet, and then bent along the broken line in FIG. 12 to achieve the shape as illustrated in FIG. 11. In this embodiment, the metal conductive sheet is a copper sheet, but not being limited thereto.

Figure 15:
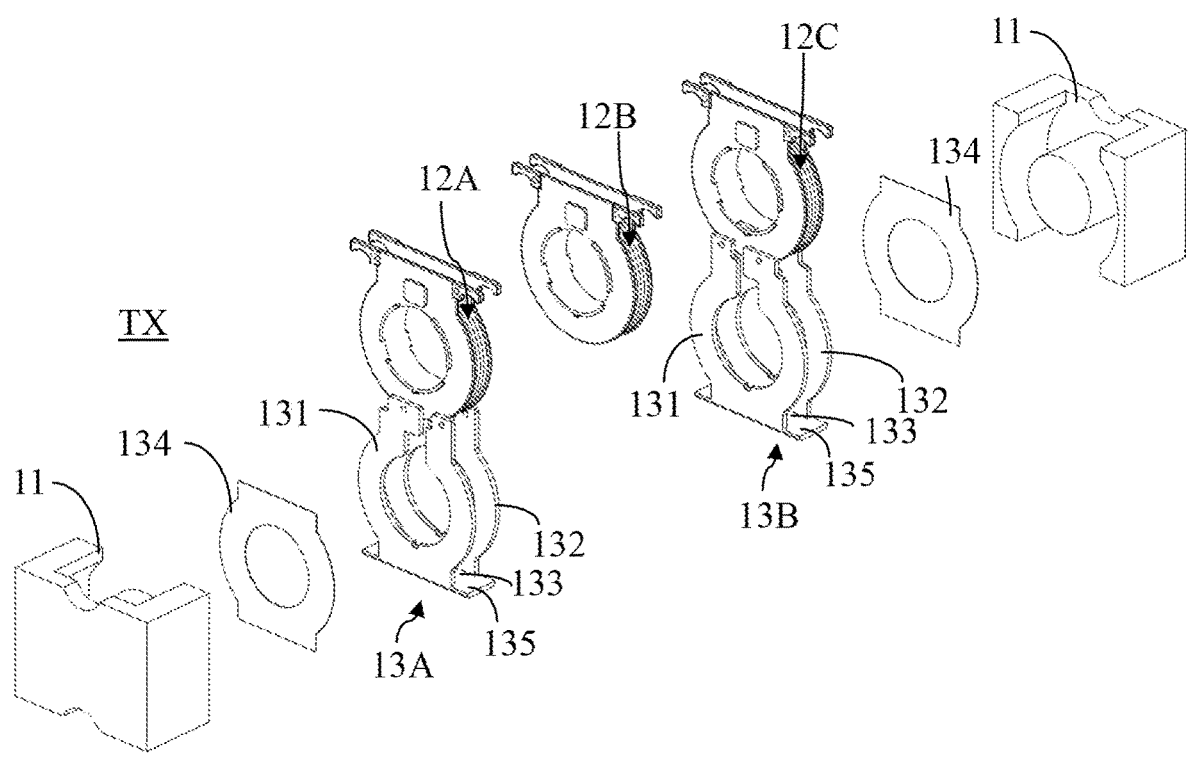
FIGS. 15-16 illustrate exploded views of a transformer according to another embodiment of the present disclosure, wherein the windings in FIG. 15 are assembled in FIG. 16.
Figure 16:
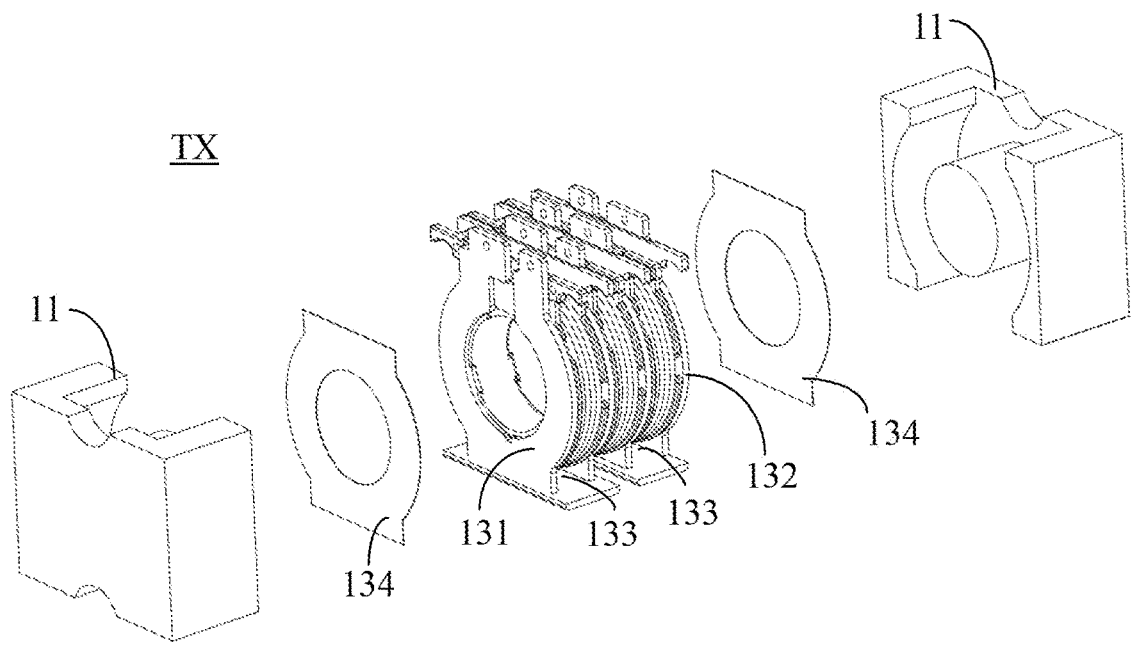

Reference is made to FIGS. 11-12 and 15-16. FIGS. 15-16 illustrate exploded views of a transformer according to another embodiment of the present disclosure, wherein the windings (12A, 12B, 12C, 13A, 13B) are assembled in FIG. 16. The transformer TX includes two opposite first cores 11 and windings. The windings include at least one primary winding 12 and at least one secondary winding 13. Each secondary winding 13 includes a first section 131 and a second section 132. The first section 131 has a first outlet end 1311, a second outlet end 1312, a first connection end 1313, and a first opening 1314. The first outlet end 1311 and the second outlet end 1312 are at one side of the first section 131 while the first connection end 1313 is at an opposite side of the first section 13. The second section 132 has a third outlet end 1321, a fourth outlet end 1322, a second connection end 1323, and a second opening 1324. The third outlet end 1321 and the fourth outlet end 1322 is at one side of the second section 132 while the second connection end 1323 is at an opposite side of the second section 132. The second section 132 is in parallel with the first section 131. At least a portion of the second connection end 1323 and at least a portion of the first connection end 1313 are joined to collectively form a connection portion 133. The at least one primary winding 12 is located between the first section 131 and the second section 132 of the at least one secondary winding 13. The heat dissipation manner in this embodiment is similar to the previous embodiment as discussed in FIGS. 11-14.

The transformer TX may further include at least one bobbin 14, and each primary winding 12 includes a plurality of coils wound in the slots of the bobbin 14 respectively. The bobbin 14 is provided with a convex position block 141. The positioning portion 141 engage the first opening 1314 and/or the second opening 1324 when the bobbin 14 is assembled with the secondary winding 13. In this embodiment, the coils of the primary winding may constitute a triple insulation wire, which is a preferred embodiment, but not being limited thereto.

In this embodiment, the first section 131 and the second section 132 have substantially the same or similar profiles or dimensions.

In this embodiment, the first outlet end 1311 is opposite to and spaced from the third outlet end 1321, and the second outlet end 1312 is opposite to and spaced from the fourth outlet end 1322.

In this embodiment, the secondary winding 13 is integrally formed by stamping a single piece of conductive metal sheet, and then bent along the broken line in FIG. 12 to achieve the shape as illustrated in FIG. 11. In this embodiment, the metal conductive sheet is a copper sheet, but not being limited thereto.

In a preferred embodiment, the transformer TX may further include an insulation sheet 134 between the first section 131 and/or the second section 132 and the first cores 11. Quantity or location of the insulation sheet 134 is not limited in this invention.

In this embodiment, each secondary winding 13 may further include at least one extension portion 135 connected to at least one side of the connection portion 133. In this embodiment, the connection portion 133 and the extension portion 135 are integrally formed, but not being limited thereto. The integrally formed connection portion 133 and extension portion 135 may also be referred as the heat-dissipating end in previous embodiments. The extension portion 135 can also be connected to any positon of the first section 131 or the second section 132.

In an embodiment illustrated in FIGS. 11-13, the first section 131 of the secondary winding, the at least one primary winding 12, and the second section 132 of the secondary winding are sequentially arranged. In another embodiment illustrated in FIGS. 15-16, the transformer TX includes a first secondary winding 13A, a second secondary winding 13B, a first primary winding 12A, a second primary winding 12B, and a third primary winding 12C. The first section 131 of the first secondary winding 13A, the first primary winding 12A, the second section 132 of the first secondary winding 13A, the second primary winding 12B, the first section 131 of the second secondary winding 13B, the third primary winding 12C, and the second section 132 of the second secondary winding 13B are sequentially arranged, but not being limited thereto.

In another embodiment of the present invention, the transformer TX includes a first secondary winding 13A, a second secondary winding 13B, a first primary winding 12A, a second primary winding 12B, and a third primary winding 12C. The first section 131 of the first secondary winding 13A, the first primary winding 12A, the first section 131 of the second secondary winding 13B, the second primary winding 12B, the second section 132 of the first secondary winding 13A, the third primary winding 12C, the second section 132 of the secondary winding 13B are sequentially arranged.

In this embodiment, the first outlet end 1311, the second outlet end 1312, the third outlet end 1321, and the fourth outlet end 1321 may have a raised portion T and a raised portion T1, respectively. The raised portion T and the raised portion T1 have a height configured to be contacted by a printed circuit board, and can be adapted to different PCB thicknesses by adjusting the raised portion size, or can be adapted to a different distance between the connection portion 133 and an external heat sink.

Figure 17:
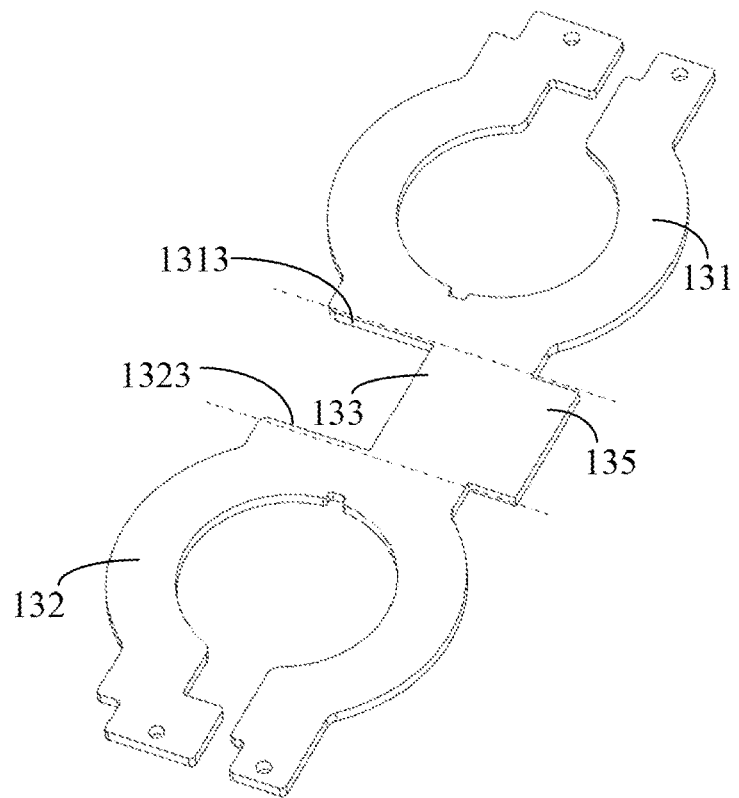
FIG. 17 illustrates a planar view of a secondary winding according to another embodiment of the present disclosure.
Figure 18:
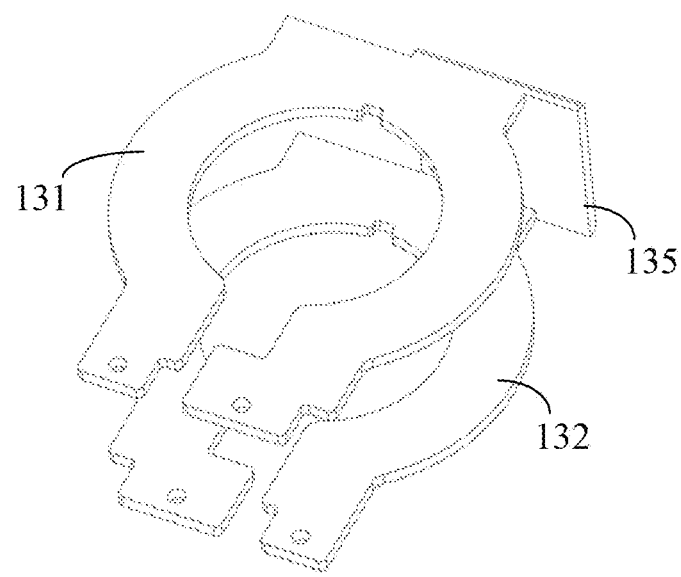
FIG. 18 illustrates a perspective view of the secondary winding in FIG. 17.

Reference is made to FIGS. 17-18. FIG. 17 illustrates a planar view of a secondary winding according to another embodiment of the present disclosure, and FIG. 18 illustrates a perspective view of the secondary winding in FIG. 17. The secondary winding in this embodiment is different from the secondary winding in FIGS. 11-12 in that a portion of the second connection end 1323, i.e., a portion of a second connection side of the second section 132, and a portion of the first connection end 1313, i.e., a portion of a first connection side of the first section 131, are joined to collectively form a connection portion 133, and an extension portion 135 is provided and connected to one side of the connection portion 133.

Figure 19:
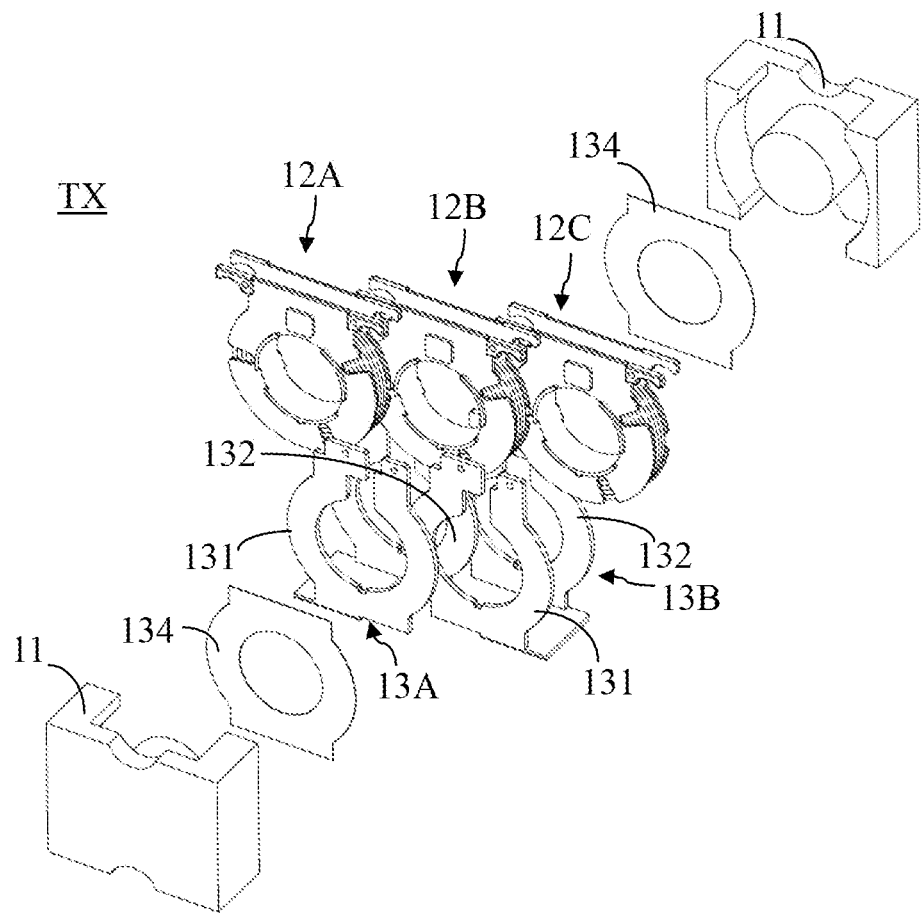
FIGS. 19-20 illustrate exploded views of a transformer according to still another embodiment of the present disclosure, wherein the windings are assembled in FIG. 20.
Figure 20:
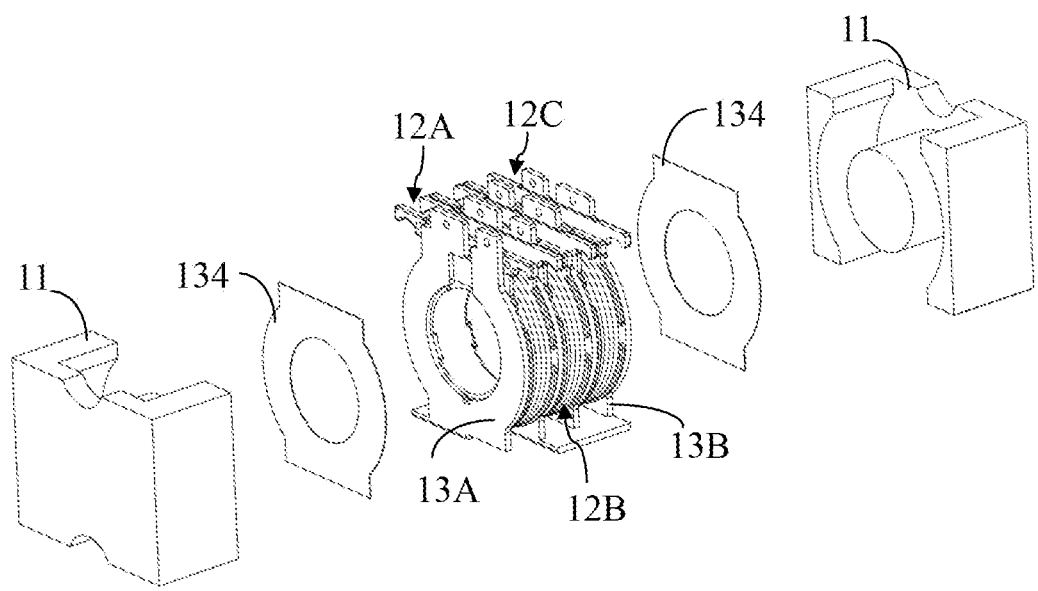

Reference is made to FIGS. 19 and 20. FIGS. 19-20 illustrate exploded views of a transformer according to still another embodiment of the present disclosure, wherein the windings (12A-C and 13A-B) are assembled in FIG. 20. The transformer in this embodiment is different from the transformer in FIGS. 15-16 in that the transformer TX includes a first secondary winding 13A, a second secondary winding 13B, a first primary winding 12A, a second primary winding 12B, and a third primary winding 12C. And, the first section 131 of the first secondary winding 13A, the first primary winding 12A, the first section 131 of the second secondary winding 13B, the second primary winding 12B, the second section 132 of the first secondary winding 13A, the third primary winding 12C, and the second section 132 of the secondary winding 13B are sequentially arranged.

The configuration of the secondary windings illustrated in FIGS. 17-18 is a preferred embodiment, but not being limited thereto.

Figure 21:
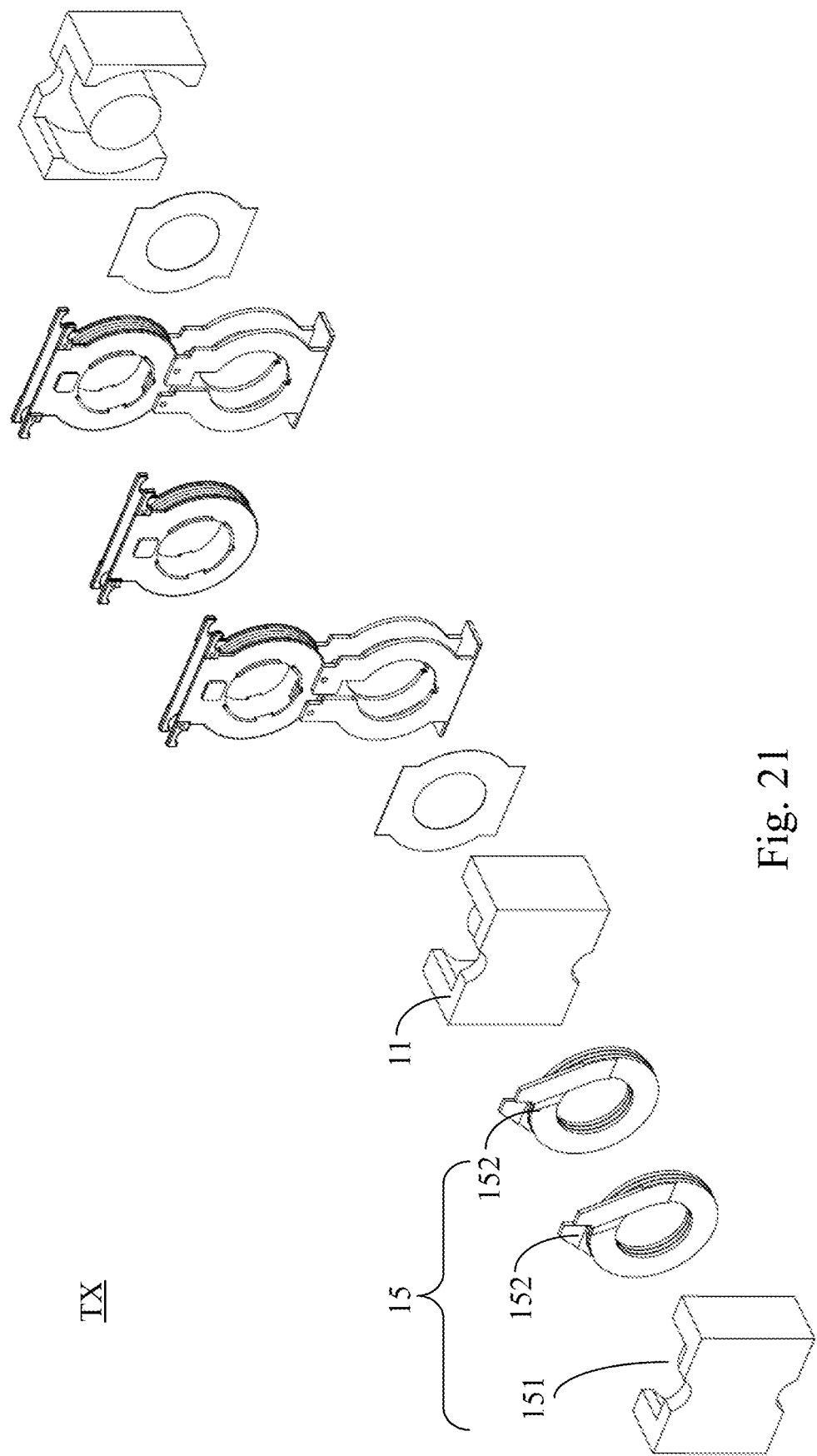
FIG. 21 illustrates an exploded view of a transformer according to still another embodiment of the present disclosure.

Reference is made to FIG. 21, which illustrates an exploded view of a transformer according to still another embodiment of the present disclosure. The transformer in this embodiment is different from the transformer in FIGS. 15-16 or in FIGS. 19-20 in that the transformer TX further includes an inductor 15. The inductor 15 includes a second core 151 and at least one inductor winding 152. The second core 151 is located at one side of the at least one first core 11. The at least one inductor winding 152 is installed between the second core 151 and the first core 11.

Figure 22:
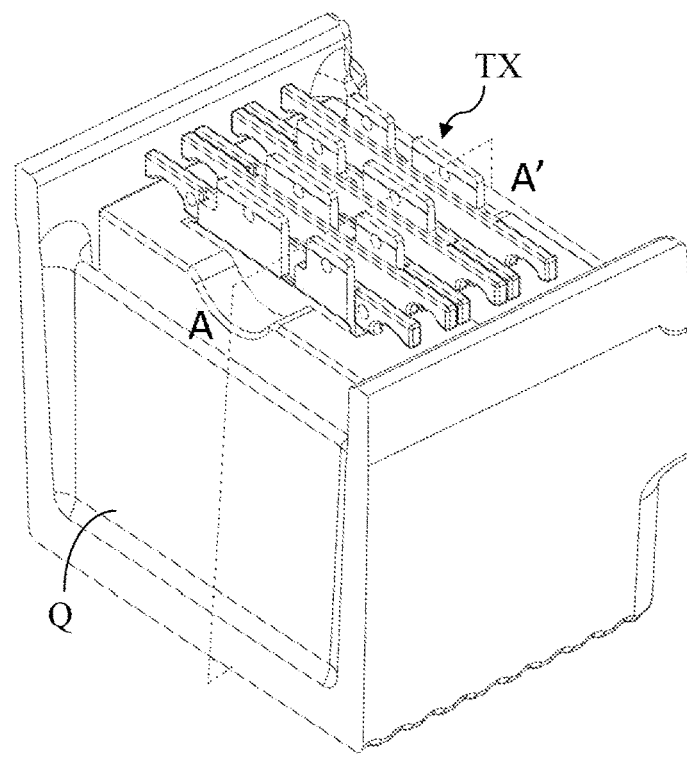
FIG. 22 illustrates a perspective view of a power supply module according to an embodiment of the present disclosure.
Figure 23:
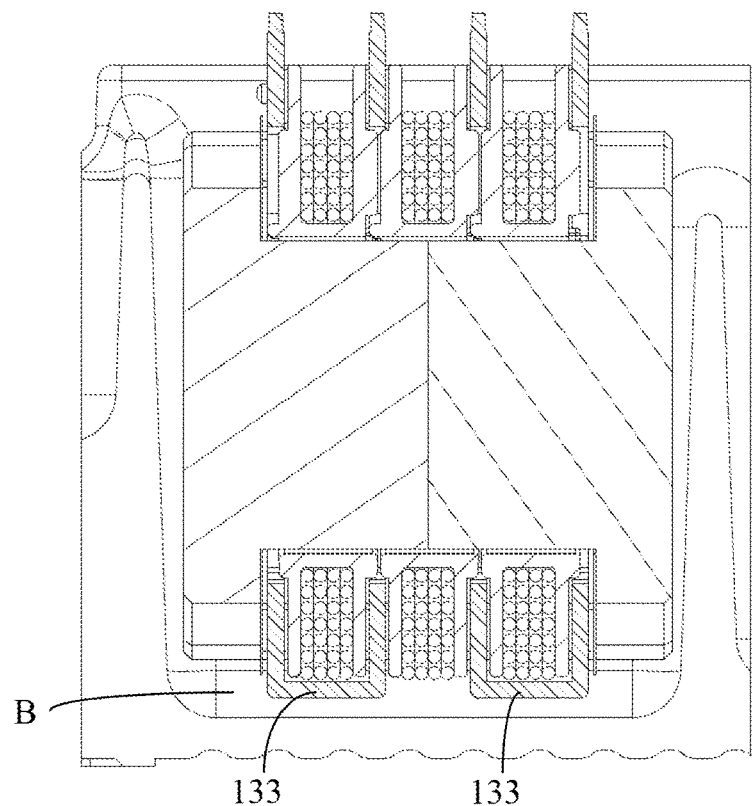
FIG. 23 illustrates a cross-sectional view taken along the line A-A' in FIG. 22.

Reference is made to FIGS. 22-23. FIG. 22 illustrates a perspective view of a power supply module according to an embodiment of the present disclosure, and FIG. 23 illustrates a cross-sectional view taken along the line A-A' in FIG. 22. The power supply module may include a chamber Q and a transformer TX of any foregoing embodiments accommodated in the chamber Q.

In this embodiment, the power supply module may further include a thermal resin filled into the chamber Q and at least partially wrapped around the transformer TX.

In this embodiment, the power supply module may further include a heat dissipation plate B located under and/or around the chamber Q to dissipate heat out of the chamber Q. In this embodiment, the heat dissipation plate B is a water-cooling plate, but not being limited thereto.

The connection portion 133 and the thermal resin are in sufficient contact such that a thermal resistance between the heat-generating element and the heat dissipation plate is greatly reduced. The heat generated by the secondary winding and the primary winding are easily conducted to the connection portion 133 and the extension portion 135, which greatly facilitates the dissipation of heat and reduces an internal temperature with the transformer windings. In this embodiment, there are two paths of the heat conduction. The first path is originated from the primary winding in which heat is conducted from an inner coil to an outer coil and then conducted to the thermal resin. The second path is also originated from the primary winding in which heat is conducted from an inner coil to the conductive copper sheet of the secondary winding directly or via the bobbin, and heat is then transferred from the conductive copper sheet of the secondary winding to the connection portion 133 and the extension portion 135 and finally transferred to the thermal resin. The second path will be a major heat dissipation path. Therefore, the heat generated by either the primary winding or the secondary winding can be transferred to the connection portion 133 and the extension portion 135 through a certain heat transfer path and entered into the thermal resin, and then dissipated through the heat dissipation plate.

In sum, the transformer and the power supply module disclosed herein can dissipate heat more easily and have a lower temperature rise under a predetermined power consumption or loss, thereby appropriately reducing the volume and weight of the transformer. That is, the power processing capability of the power supply module can be effectively improved while maintaining the volume and weight. An appropriate external connection can also form a sandwich structure that enhances the coupling of the primary and secondary windings to reduce power losses and improve power efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A transformer comprising:
   two first cores disposed opposite to each other;
   at least one primary winding; and
   at least one secondary winding comprising:
   a first section having a first outlet end, a second outlet end, a first connection end, and a first opening, wherein the first outlet end and the second outlet end are disposed at a side of the first section, the first connection end is disposed at an opposite side of the first section; and
   a second section having a third outlet end, a fourth outlet end, a second connection end, and a second opening, wherein the third outlet end and the fourth outlet end are disposed at a side of the second section, the second connection end is disposed at an opposite side of the second section, the second section is in parallel with the first section, and at least a portion of the second connection end of the second section and at least a portion of the first connection end of the first section are joined to collectively form a connection portion, the connection portion is a bent portion of a single piece of conductive metal sheet,
   at least a portion of the at least one primary winding is disposed between the first section and the second section of the at least one secondary winding.

2. The transformer of claim 1, wherein the first outlet end is disposed opposite to the third outlet end, and the second outlet end is disposed opposite to the fourth outlet end.

3. The transformer of claim 2, wherein the first outlet end and the second outlet end constitute a first outer connection port of a first coil, the third outlet end and the fourth outlet end constitute a second outer connection port of a second coil, the first outer connection port and the second outer connection port are connected to an external circuit respectively.

4. The transformer of claim 2, wherein the first outlet end and the fourth outlet end constitute a third outer connection port of a first coil, the second outlet end and the third outlet end constitute a fourth outer connection port of a second coil, the third outer connection port and the fourth outer connection port are connected to an external circuit respectively.

5. The transformer of claim 1, wherein the first section and the second section are two parallel portions of the single piece of conductive metal sheet.

6. The transformer of claim 1, wherein the secondary winding further comprises:
   an insulation sheet between the first section and one of the two first cores;
   an insulation sheet between the second section and one of the two first cores; or
   an insulation sheet between the first section and one of the two first cores and another insulation sheet between the second section and the other one of the two first cores.

7. The transformer of claim 1, wherein the secondary winding further comprises at least one extension portion coupled to at least one side of the connection portion.

8. The transformer of claim 7, wherein the extension portion and the connection portion are of an integrally formed piece.

9. The transformer of claim 1, wherein the first section, the at least one primary winding, and the second section are sequentially arranged.

10. The transformer of claim 1, wherein the at least one secondary winding comprises a first secondary winding and a second secondary winding, the at least one primary winding comprises a first primary winding, a second primary winding, and a third primary winding, wherein the first section of the first secondary winding, the first primary winding, the second section of the first secondary winding, the second primary winding, the first section of the second secondary winding, the third primary winding, and the second section of the second secondary winding are sequentially arranged.

11. The transformer of claim 1, wherein the at least one secondary winding comprises a first secondary winding and a second secondary winding, the at least one primary winding comprises a first primary winding, a second primary winding, and a third primary winding, wherein the first section of the first secondary winding, the first primary winding, the first section of the second secondary winding, the second primary winding, the second section of the first secondary winding, the third primary winding, and the second section of the second secondary winding are sequentially arranged.

12. The transformer of claim 1, wherein the first outlet end, the second outlet end, the third outlet end and the fourth outlet end all include a raised portion having a height.

13. The transformer of claim 1, further comprising at least one bobbin, wherein the primary winding comprises a plurality of coils respectively wound in slots of the bobbin, and the bobbin has a convex position block that correspondingly engages at least one of the first opening and the second opening when the transformer is assembled.

14. The transformer of claim 13, wherein the coils of the primary winding constitute a triple insulation wire.

15. The transformer of claim 1, further comprising an inductor having:
a second core disposed at one side of the first cores; and
at least one inductor winding disposed between the second core and the first cores.

16. A power supply module comprising the transformer of claim 1.

17. The power supply module of claim 16, further comprising a chamber that accommodates the transformer.

18. The power supply module of claim 17, further comprising a thermal resin filled into the chamber and at least partially wrapped around the transformer.

19. The power supply module of claim 18, further comprising a heat dissipation plate disposed under the chamber or around the chamber to dissipate heat out of the chamber.

20. The power supply module of claim 19, wherein the heat dissipation plate is a water-cooling plate.

* * * * *